United States Patent
Givert et al.

(10) Patent No.: US 12,060,809 B2
(45) Date of Patent: Aug. 13, 2024

(54) VANE FOR A TURBINE ENGINE WITH OPTIMIZED HEEL AND METHOD FOR OPTIMIZING A VANE PROFILE

(71) Applicant: SAFRAN AIRCRAFT ENGINES, Paris (FR)

(72) Inventors: Maxime Paul Numa Givert, Moissy-Cramayel (FR); Christophe Damour, Moissy-Cramayel (FR); Alexandre Gimel, Moissy-Cramayel (FR); Elsa Maxime, Moissy-Cramayel (FR); Denis Gabriel Trahot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/617,749

(22) PCT Filed: Jun. 12, 2020

(86) PCT No.: PCT/FR2020/051007
§ 371 (c)(1),
(2) Date: Dec. 9, 2021

(87) PCT Pub. No.: WO2020/249914
PCT Pub. Date: Dec. 17, 2020

(65) Prior Publication Data
US 2022/0235663 A1     Jul. 28, 2022

(30) Foreign Application Priority Data

Jun. 14, 2019 (FR) ...................... 1906411

(51) Int. Cl.
*F01D 5/14* (2006.01)
*F01D 5/22* (2006.01)

(52) U.S. Cl.
CPC .............. *F01D 5/141* (2013.01); *F01D 5/22* (2013.01); *F05D 2220/323* (2013.01); *F05D 2240/30* (2013.01); *F05D 2260/96* (2013.01)

(58) Field of Classification Search
CPC ......... F05D 2220/323; F05D 2240/304; F05D 2240/80; F05D 2240/30; F05D 2250/31;
(Continued)

(56) References Cited

U.S. PATENT DOCUMENTS

| 4,165,949 A | 8/1979 | Riollet | |
| 2017/0152752 A1* | 6/2017 | Myers | ..................... F01D 5/082 |

FOREIGN PATENT DOCUMENTS

| EP | 1 612 372 A1 | 1/2006 |
| JP | H07253001 A | 10/1995 |

(Continued)

OTHER PUBLICATIONS

Machine Translation of JP H0960501A [retrieved on Mar. 9, 2023]. Retrieved from: Espacenet. (Year: 2023).*
(Continued)

*Primary Examiner* — Eric J Zamora Alvarez
(74) *Attorney, Agent, or Firm* — CHRISTENSEN O'CONNOR JOHNSON KINDNESS PLLC

(57) ABSTRACT

A turbine engine has a blade with lower and upper surfaces. The blade has a root at a radially external end and includes a transverse head section in a plane perpendicular to a radial direction of the blade, taken at the radially external end with a first center of gravity. The root has a second center of gravity defined in a plane parallel to the transverse head section and transversely offset from the first center of gravity. The second center of gravity is defined in a predetermined zone at least partly demarcated by a V that is open towards the lower surface and includes a peak, the orthogo-
(Continued)

nal projection of which on the transverse head section is located on the first center of gravity.

16 Claims, 4 Drawing Sheets

(58) Field of Classification Search
CPC .......... F05D 2260/941; F05D 2260/96; F01D 5/082; F01D 5/147; F01D 5/141; F01D 5/22; F01D 5/225; Y02T 50/60
See application file for complete search history.

(56) References Cited

FOREIGN PATENT DOCUMENTS

| JP | H0960501 A | 3/1997 |
|----|------------|--------|
| JP | 2000018003 A | 1/2000 |

OTHER PUBLICATIONS

International Search Report mailed Oct. 26, 2020, issued in corresponding International Application No. PCT/FR2020/051007, filed Jun. 12, 2020, 7 pages.
Written Opinion mailed Oct. 26, 2020, issued in corresponding International Application No. PCT/FR2020/051007, filed Jun. 12, 2020, 7 pages.
English translation of Written Opinion mailed Oct. 26, 2020, issued in corresponding International Application No. PCT/FR2020/051007, filed Jun. 12, 2020, 9 pages.
International Preliminary Report on Patentability mailed Dec. 14, 2021, issued in corresponding International Application No. PCT/FR2020/051007, filed Jun. 12, 2020, 8 pages.

* cited by examiner

VANE FOR A TURBINE ENGINE WITH OPTIMIZED HEEL AND METHOD FOR OPTIMIZING A VANE PROFILE

FIELD OF THE DISCLOSURE

The present disclosure relates to the field of vanes for a turbine engine of an aircraft. In particular, it relates to the design and/or manufacture of these vanes for turbine engines.

BACKGROUND

The prior art includes the documents JP-A-H09 60501, JP-A-2000 018003, JP-A-H07 253001, U.S. Pat. No. 4,165,949, and EP-A1-1 612 372.

Many mechanical parts of turbine engines are being modified and/or redesigned to improve the performance of the turbine engine. The low-pressure turbine vanes are in particular concerned, with optimised aerodynamic profiles. Generally speaking, a low-pressure turbine vane for a movable wheel comprises an aerodynamic blade extending along a radial axis perpendicular to the longitudinal axis and delimited radially by an inner root and an outer heel. The blade comprises a leading edge and a trailing edge which are connected by pressure side and suction side surfaces. One way of optimising the aerodynamic profile of the blade is to reduce the thickness of the trailing edge of the vane by about 0.30 mm (from 1 mm of the trailing edge along the circulation of the gas in the turbine engine), so as to avoid aerodynamic losses.

However, this new geometry introduces particular new constraints in terms of manufacturability and design to meet service life objectives compared to "conventional" vanes. The trailing edges are also subject to high mechanical stresses over their entire radial height and in particular at the junctions with the root and/or heels of the vanes when the latter rotate.

In particular, the present disclosure aims to provide a vane for a turbine engine, the profile of which is optimised so as to reduce the stresses applied to its trailing edge during operation of the turbine engine.

SUMMARY

This is achieved in accordance with the disclosure by a vane for a turbine engine of an aircraft comprising a blade extending in a radial direction, the blade having a pressure side surface and a suction side surface which are connected upstream, in a direction of circulation of a gas in the turbine engine, by a leading edge and downstream by a trailing edge, the blade having at a radially outer end, a heel and comprising a transverse head section in a plane perpendicular to a radial direction of the blade, taken at the radially outer end, the heel extending radially towards the outside from the transverse head section which has a first centre of gravity, the heel having a second centre of gravity which is defined in a plane parallel to the transverse head section, the second centre of gravity being offset at least transversely from the first centre of gravity, the second centre of gravity being defined in a predetermined zone delimited at least in part by a first straight line and a second straight line substantially forming a V which is open towards the pressure side surface and which comprises an apex whose orthogonal projection on the transverse head section is located on the first centre of gravity.

Thus, this solution achieves the above-mentioned objective. In particular, such an arrangement of the centre of gravity of the heel allows to reduce the stresses applied to the trailing edge by about 10%, taking into account the manufacturing constraints of the vane and the aerodynamic profile of the vane. This vane profile is also more efficient and its trailing edge can be even thinner. Such a vane can also be adapted to any type of turbine engine without the need for structural modifications to it to integrate the vane.

The vane also comprises one or more of the following features, taken alone or in combination:
- the transverse head section is located radially just below the heel.
- the first centre of gravity is linked to a reference frame of inertia comprising a first axis of inertia and a second axis of inertia which are perpendicular and which pass through the first centre of gravity, the first straight line being inclined at a first angle to the first axis of inertia and the second straight line being inclined at a second angle to the first axis of inertia.
- the predetermined zone is delimited by a third straight line which is parallel to the first axis of inertia and which is offset towards the pressure side surface by a predetermined distance.
- the blade is full.
- the vane comprises a root located at a radially inner end of the blade, opposite in the radial direction to the radially inner end, the trailing edge having a first thickening located radially between a first platform of the root and the blade, and extending at least partially transversely on either side of the trailing edge.
- the heel comprises a second platform which is defined in a plane inclined radially towards the outside and forming an angle of between 0° and 40° with the plane of the transverse head section.
- the trailing edge has a second thickening located radially between the second platform and the blade, and extending at least partially transversely on either side of the trailing edge.
- the first thickening and the second thickening each comprise an axial section of generally triangular shape.
- the first thickening and the second thickening each extend respectively from one of the radially inner and outer ends between 10 and 30% of the radial height of the blade.
- the predetermined zone is delimited by the median line of the blade which is intersected by the first straight line and the second straight line.
- the predetermined zone is delimited by a curved line parallel to the median line of the blade, the curved line being located at a maximum distance corresponding to twice the transverse thickness of the blade from the suction side surface.

The disclosure also relates to a wheel of a turbine engine comprising a disc centred on a longitudinal axis and a plurality of vanes having any of the above features, extending from the periphery of the disc and evenly distributed around the longitudinal axis.

The disclosure also relates to a turbine engine comprising a vane or wheel as aforesaid.

Finally, the disclosure relates to a method for optimising a vane for a turbine engine of an aircraft, the vane comprising a blade, extending in a radial direction, with a heel at a radially outer end and a transverse head section at the radially outer end, the heel extending radially towards the outside from the transverse head section, the method comprising the following steps:

calculating a first centre of gravity of the transverse head section of the blade, calculating a second centre of gravity of the heel;

comparing the coordinates of the first centre of gravity of transverse head section and the second centre of gravity of the heel;

measuring the distance between the first and second centre of gravity according to an orthogonal projection of the plane in which the second centre of gravity of the heel is defined in the plane of the transverse head section; and compensating in which the second centre of gravity of the heel is offset at least transversely from the first centre of the gravity of the transverse head section in a predetermined zone, the predetermined zone being delimited at least partially by a first straight line and a second straight line substantially forming a V which is open towards a pressure side surface of the blade and which comprises an apex, the orthogonal projection of which is located on the first centre of gravity.

According to the method, the latter comprises a step of offsetting a trailing edge of the blade and/or a leading edge of the blade with respect to a first axis of inertia of a reference frame of inertia.

According to the method, the transverse head section is located radially just below the heel.

DESCRIPTION OF THE DRAWINGS

The disclosure will be better understood, and other purposes, details, characteristics and advantages thereof will become clearer on reading the following detailed explanatory description of embodiments of the disclosure given by way of purely illustrative and non-limiting examples, with reference to the attached schematic drawings in which.

DETAILED DESCRIPTION

Figure 1:
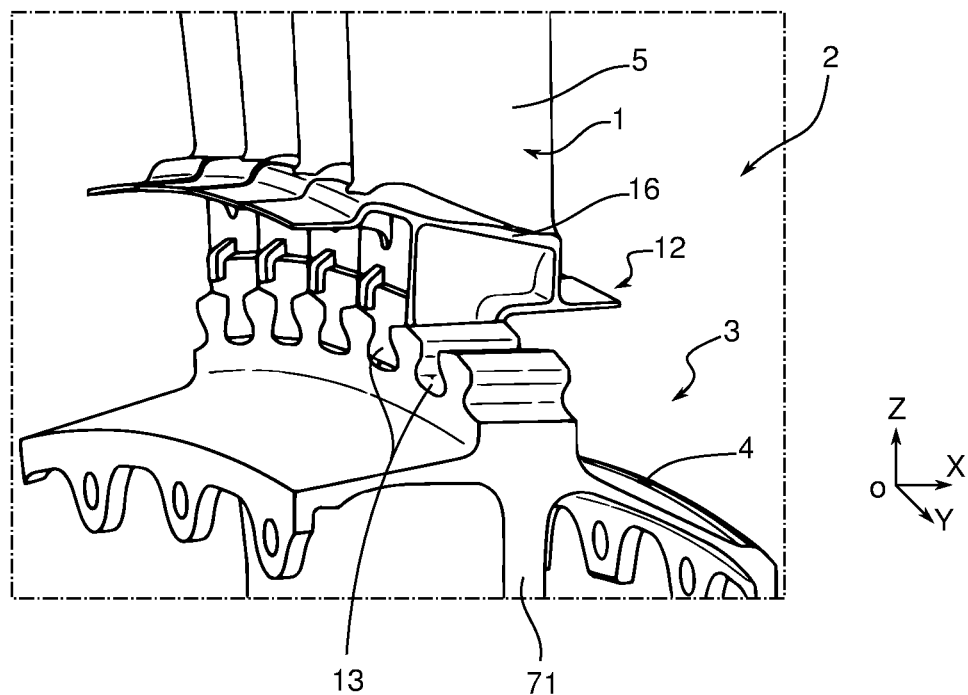
FIG. 1 shows an example of a movable wheel comprising a disc and vanes extending from the periphery of the disc.

FIG. 1 shows a vane 1 for a turbine of a turbine engine 2 of longitudinal axis X for aircraft and in particular a vane for a low pressure turbine wheel. However, the vane could be a compressor vane or any other vane intended to equip a turbine engine.

Generally a turbine comprises one or more stages which are arranged successively along the longitudinal axis X of the turbine engine. Each turbine stage comprises a bladed movable wheel forming a rotor and a fixed wheel with vanes forming a stator. The vanes of this stator are referred to as turbine stator vanes. Each movable wheel 3 comprises an annular disc 4 as shown in FIG. 1 which is centred on the longitudinal axis. A plurality of movable vanes 1 are mounted on the periphery of the disc and are distributed circumferentially and evenly around the disc movable wheel. Each movable wheel 3 is arranged downstream of a stator vanes wheel.

Figure 2:
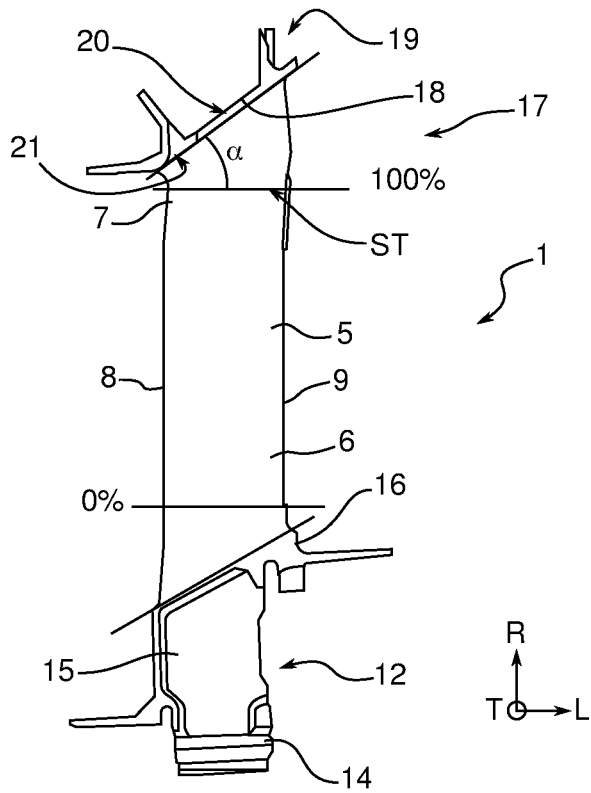
FIG. 2 is a side view of an example of a vane for a turbine engine according to the disclosure.

In FIG. 2, the turbine engine movable vane 1 comprises an aerodynamic blade 5 which extends in a radial direction R between a radially inner end 6 and a radially outer end 7. The blade 5 has a radial height which is determined between 0% at the radially inner end and 100% at the radially outer end.

In the present description, the vane will be described with respect to radial directions R, longitudinal L and transverse T directions while the turbine engine will be described with respect to longitudinal axis X, radial axis Z and transverse axis Y. The directions are perpendicular to each other. The axes are also perpendicular to each other and form an orthonormal reference frame OXYZ, with O being the origin of the reference frame. The origin of the reference frame is centred on the longitudinal axis of the turbine engine. In the installation situation, the radial direction is parallel to the radial axis.

Furthermore, the terms "upstream", "downstream", "axial", "axially" are defined with respect to the direction of circulation of gases in the turbine engine and also substantially along the longitudinal axis or direction. Similarly, the terms "radially", "inner" and "outer" are defined with respect to the radial axis or direction.

The blade 5 comprises a leading edge 8 and a trailing edge 9 which are opposite, here along the longitudinal direction of the blade. Each blade is arranged in the aerodynamic flow so that the leading edge 8 is positioned upstream of the trailing edge 9. The leading edge 8 and the trailing edge 9 are connected by a pressure side surface 10 and a suction side surface 11 (see FIG. 3) which are opposite each other in the transverse direction.

The profile of the vane is curved and the vane has a transverse thickness which varies from the leading edge to the trailing edge. In this example, the blade of the vane is full. That is, the blade does not have any cavities inside it.

Advantageously, the vane is made of a metallic material or a metallic alloy such as a nickel-based alloy. An example of a nickel-based alloy is known as DS200®.

With reference to FIGS. 1 and 2, the blade comprises at its radially inner end 6 a root 12 which is intended to engage in a correspondingly shaped groove 13 of the disc 4. The latter comprises for this purpose a plurality of grooves 13 evenly distributed around its periphery. In particular, the root 12 comprises a radially inner part which is thicker than the rest of the root and which is called a bulb 14. The latter is housed in the groove 13. The root 12 also comprises a stilt 15 which extends radially from the bulb 14. Typically, the stilt 15 is connected to the bulb via a collar.

The root 12 also comprises a first platform 16 which separates the blade from the root 12. In particular, the first platform 16 defines a radially inner wall portion delimiting a turbine engine duct in which an aerodynamic flow, in this case a primary flow, circulates. The stilt 15 extends radially between the platform 16 and the bulb 14.

The blade 5 comprises at its radially outer end 7 a heel 17. As can be seen in FIG. 2, the heel 17 typically comprises a second platform 18 intended to form a radially outer wall portion which also delimits the aerodynamic duct (here primary duct). The radially inner and outer walls are radially opposed. The heel 17 is provided with lips 19 which extend radially from a radially outer surface 20 of the platform. A radially inner surface 21 is opposite the radially outer surface and faces generally towards the root of the vane.

In operation, each vane is subject to aerodynamic forces due to the circulation of the gas flow through the turbine and the vanes, and to centrifugal forces due to the rotation of the turbine disc about the longitudinal axis.

Figure 3:
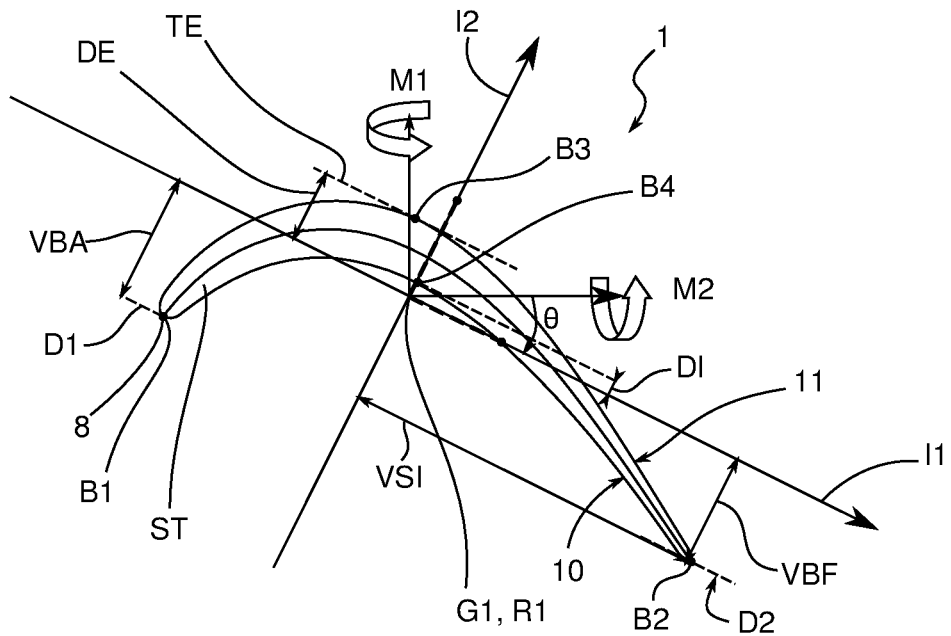
FIG. 3 is a schematic representation of a transverse head section of a turbine engine blade at a radially outer end just below a vane heel according to the disclosure.

In FIG. 3 a transverse head section ST of the blade is shown at 100% of the height of the blade (i.e. at the radially outer end) (and in particular where the heel is connected immediately to the blade) as shown in FIG. 2. We understand that the heel extends radially towards the outside from the transverse head section. The transverse head section is defined in a first plane perpendicular to the radial direction of the blade. This transverse head section ST has a first centre of gravity G1 (associated with a mass) which has been previously determined in the O, X, Y, Z reference frame (reference frame of the turbine engine). Also shown is a reference frame of inertia of the transverse head section comprising a first axis of inertia I1 (small axis of inertia) and a second axis of inertia I2 (large axis of inertia) the origin of which R1 is centred on the first centre of gravity G1 of the transverse head section. These first and second axes of inertia are perpendicular.

With reference to FIG. 3, the first centre of gravity G1 of the transverse head section ST is arranged a first predetermined distance (such as about 6 mm) from a straight line D1 defined in the first plane of the head section, tangent with the leading edge at point B1 and parallel to the first axis of inertia I1. In other words, the leading edge is at a distance VBA of the order of +6 mm from the first axis of inertia.

The first centre of gravity G1 of the transverse head section ST is also located at a second predetermined distance (such as about 5 mm) from a straight line D2 defined in the first plane of the transverse head section, tangent with the trailing edge 9 at the point B2 and parallel to the first axis of inertia I1. The trailing edge is at a distance VBF of the order of 5 mm from the first axis of inertia I1. Similarly, the trailing edge is located at a distance VSI of about 16 mm from the first axis of inertia I1.

In FIG. 3, we can also see that a straight line TE tangent to the suction side surface 11 at a point B3, parallel to the first axis of inertia I1, is located at a distance DE of about 3 mm from the first centre of gravity G1. The second axis of inertia I2 intersects the pressure side surface 10 at a point B4 located at a distance DI of approximately 0.6 mm from the first centre of gravity G1.

The blade 5 is subjected to a stress, in particular, at its trailing edge 9, which is mainly due to the bending moments (M1 and M2) created by the aerodynamic and centrifugal forces, as well as to the traction (Fz) due to the centrifugal force. This stress can be translated into the following strength of materials equation:

$$\sigma = \frac{Fz}{S} - \frac{M1}{I1}X2 - \frac{M2}{I2}X1 \qquad [\text{Math 1}]$$

With $F_2$: corresponding to the tensile force induced by the rotation of the blade.

M1 and M2: corresponding respectively to the bending moments due to the aerodynamic and centrifugal forces in the reference frame of inertia of the transverse head section at 100% height of the blade.

S: is the transverse section of the blade at the head.

X1: corresponds to the distance (VBF) between a point B2 on the trailing edge 9 and the first axis I1.

X2: corresponds to the distance (VSI) between the trailing edge 9 and the second axis I2.

This equation is advantageously applied at the leading and trailing edges of the transverse head section of the blade.

The material distribution of the blade in the transverse head section ST is greater around the second axis of inertia than around the first axis of inertia.

In order to limit, or even eliminate or transfer elsewhere, the stresses that apply to the thin trailing edge here (relatively thin thickness compared to a trailing edge of a conventional vane), the vane has an optimised profile or geometry. For example, the trailing edge 9 has a transverse thickness of 0.30 mm, or even 0.20 mm from an axial distance of 1 mm from the trailing edge.

Figure 4:
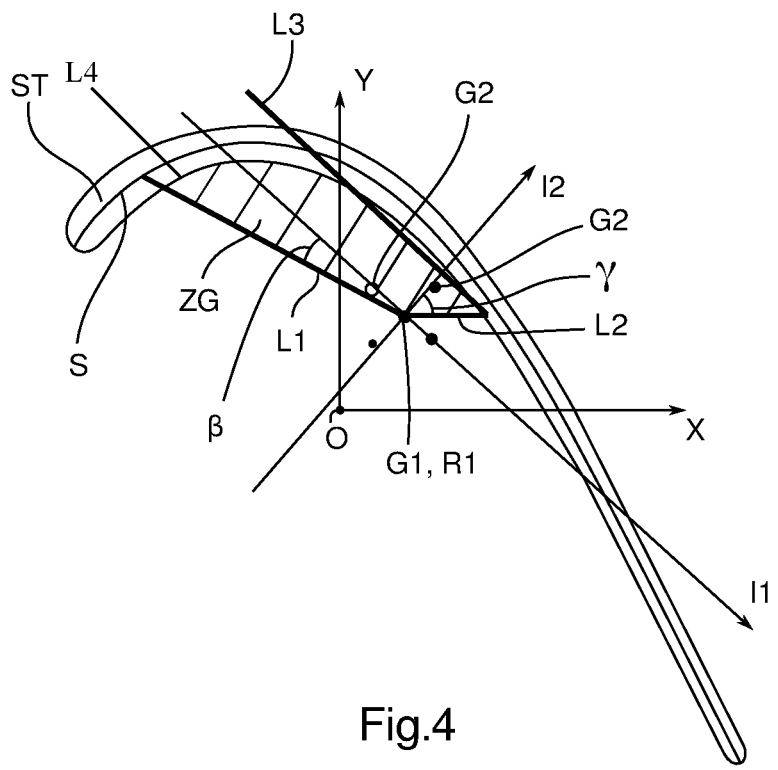
FIG. 4 schematically represents an example of a predetermined zone arrangement in which a centre of gravity of a vane heel for a turbine engine according to the disclosure is defined.

To this end and with reference to FIG. 4, the heel (associated with a mass) is configured to have a second centre of gravity G2 which is defined in a second plane (substantially perpendicular to the radial direction) which is parallel to the first plane of the transverse head section. In particular, the second centre of gravity G2 is offset at least transversely from the first centre of gravity G1 of the transverse head section ST which is located at the radially outer end (i.e. at 100% of the height of the blade along the radial direction).

Advantageously, but not restrictively, the second centre of gravity of the heel is defined in a predetermined zone ZG which is located upstream of the blade and in the vicinity of the pressure side surface 10 of the transverse head section. The predetermined zone is also defined in the plane of the second centre of gravity. Even more specifically, the predetermined zone is located upstream of a median plane of the transverse head section that is parallel to the second axis of inertia and includes the radial direction. Placing the centre of gravity of the heel in such a zone reduces the stresses at the trailing edge of the blade.

As can be seen precisely in FIG. 4, the predetermined zone ZG is shown hatched and is delimited at least partially, according to an orthogonal projection of the plane comprising the centre of gravity G2 of the heel in the plane of the transverse head section ST, by a first straight line L1 and a second straight line L2 forming substantially a V open towards the pressure side surface 10 and whose apex is located on the centre of gravity of the transverse head section ST.

The first straight line L1 is inclined by a first angle β (beta) with respect to the first axis of inertia I1 and passes through the first centre of gravity G1 of the transverse head section ST. This first angle is between 1 and 10°.

The second straight line L2 is inclined by a second angle γ (gamma) with respect to the second axis of inertia I2 and passes through the centre of gravity G1 of the transverse head section ST. The second straight line L2 is also parallel to the longitudinal axis X as we can see in FIG. 4. The second angle γ that the second straight line L2 forms with the second axis of inertia is advantageously between 35° and 50°.

The predetermined zone ZG is also delimited at least partially by a third straight line L3 which is parallel to the first axis of inertia. This third straight line L3 is located at a distance from the first axis of inertia (towards the suction side surface) which is between 0 and 1 mm depending on the geometry of the vane and the turbine stages.

We can also see in FIG. 4 that the predetermined zone ZG is delimited upstream by the median line S of the curved blade which intersects the first straight line L1 and the second straight line L2.

More generally, the predetermined zone ZG is delimited by:
the first straight line L1,
the second straight line L2 which substantially forms a V open towards the pressure side surface 10, the orthogonal projection of the apex of the V on the transverse head section is located on the first centre of gravity G1,
and a curved line L4 parallel to the median line S which is located at a maximum distance corresponding to twice the transverse thickness of the blade from the suction side surface. This curved line intersects the first straight line and second straight line and is a maximum boundary of the predetermined zone ZG beyond the suction side surface.

The platform 18 of the heel 17 is defined in plane inclined radially towards the outside. The plane forms an angle α (alpha) which is between 0° and 40° with the plane of the transverse head section. The angle simplifies the modelling by calculation which avoids working with non-whole and/or inclined sections. This angle depends on the shape of the duct of the turbine but also on the geometry of the blade.

Advantageously, for a heel weighing between 10 and 20 g, the third straight line L3 is offset from the first axis of inertia by a distance of between 0 and 0.3 mm with a platform inclined between 20 and 30° with respect to the plane of the transverse head section. Alternatively, the third straight line is at a distance of between 0 and 1 mm with a platform inclined between 0 and 20° to the plane of the head section.

Figure 5:
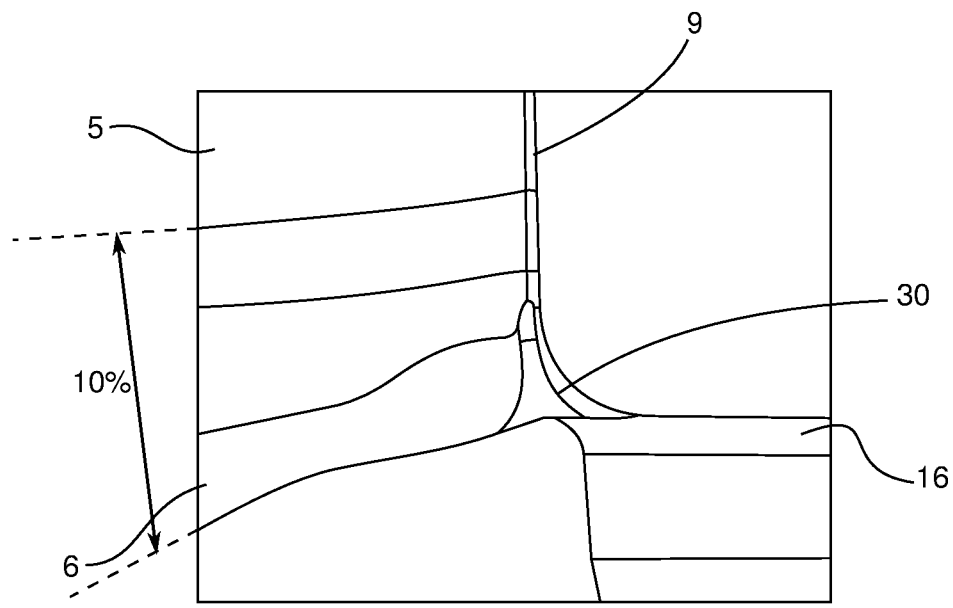
FIG. 5 is a perspective and detail view of a vane root with a thickening at the trailing edge according to an embodiment of the disclosure.

Another possibility or addition to reduce the stress at the trailing edge is to optimise the profile of the trailing edge locally. With reference to FIG. 5, the trailing edge 9 has a first thickening 30 located between the platform of the root and the blade and extending at least partially transversely on either side of the trailing edge. This thickening 30 also extends over 10% of the height of the blade from the radially inner end 6. The thickening or extra thickness is of the order of 0.05 mm (in the transverse direction). Advantageously, the thickening has a substantially triangular axial section.

Figure 6:
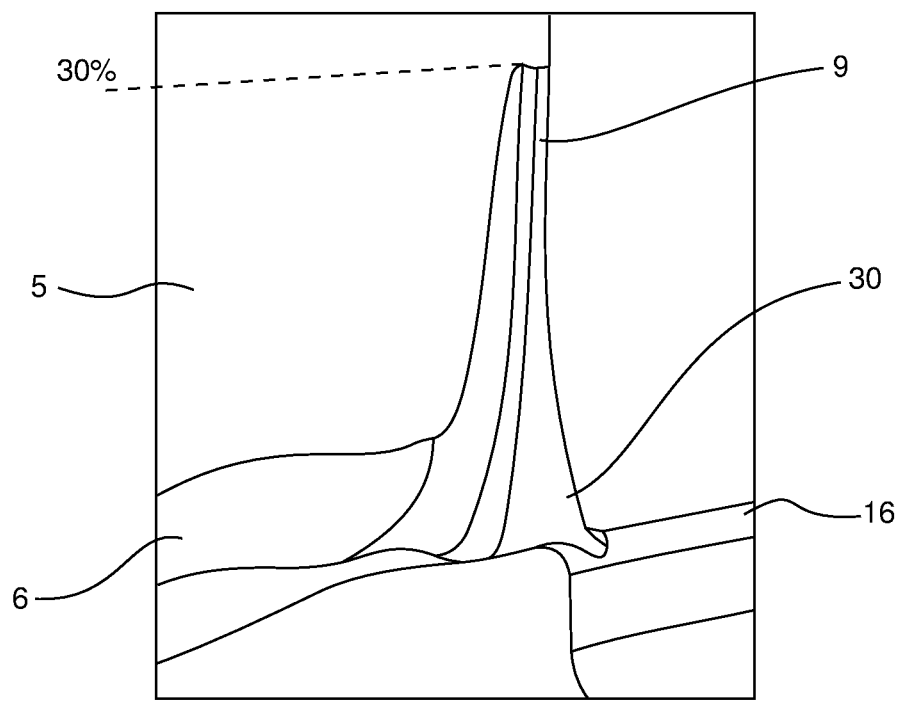
FIG. 6 is a perspective and detail view of a vane root with a thickening at the trailing edge according to another embodiment of the disclosure.

According to another embodiment illustrated in FIG. 6, the first thickening 30 is located between the platform 16 of the root and the trailing edge 9 of the blade. The first thickening 30 extends on the one hand transversely on either side of the trailing edge and on the other hand over a radial height of up to approximately 30% of the height of the blade.

The addition of this thickening at the trailing edge and at the radially inner end of the blade allows a stress reduction of between 2 and 7%. This thickening also makes it easier to manufacture the blade with the thin trailing edge. This geometry also enables to limit the risk of abatement of the material. The abatement is then likely to occur in a less constrained zone than originally and allows for a 10-20% margin gain on some materials.

Figure 7:
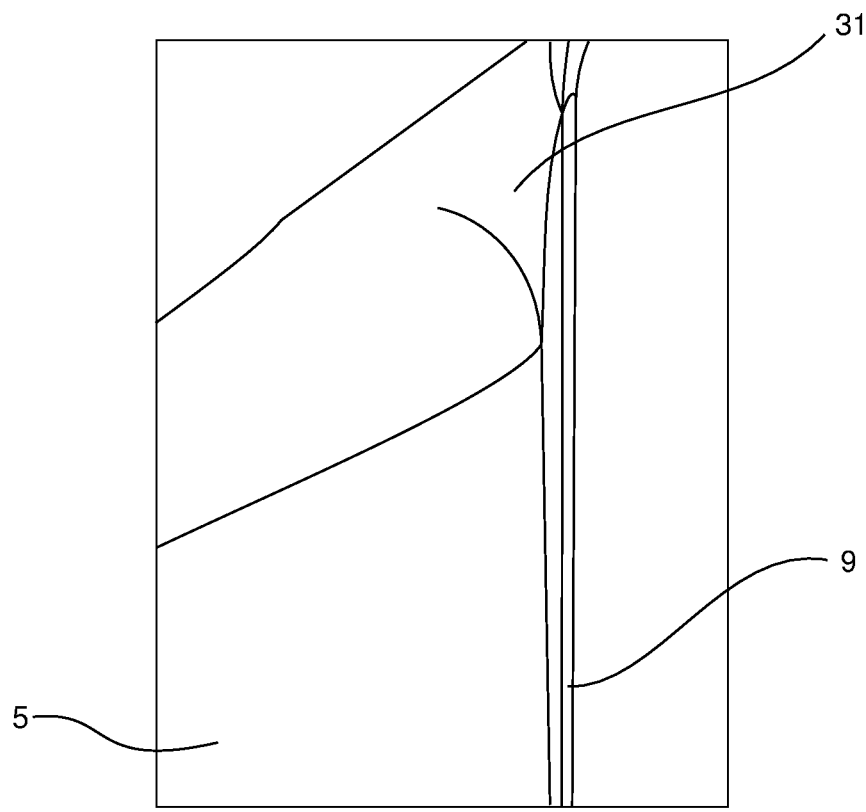
FIG. 7 is a view of the blade of a vane for a turbine engine at its radially outer end and which comprises a thickening at the trailing edge according to the disclosure.
Figure 8:
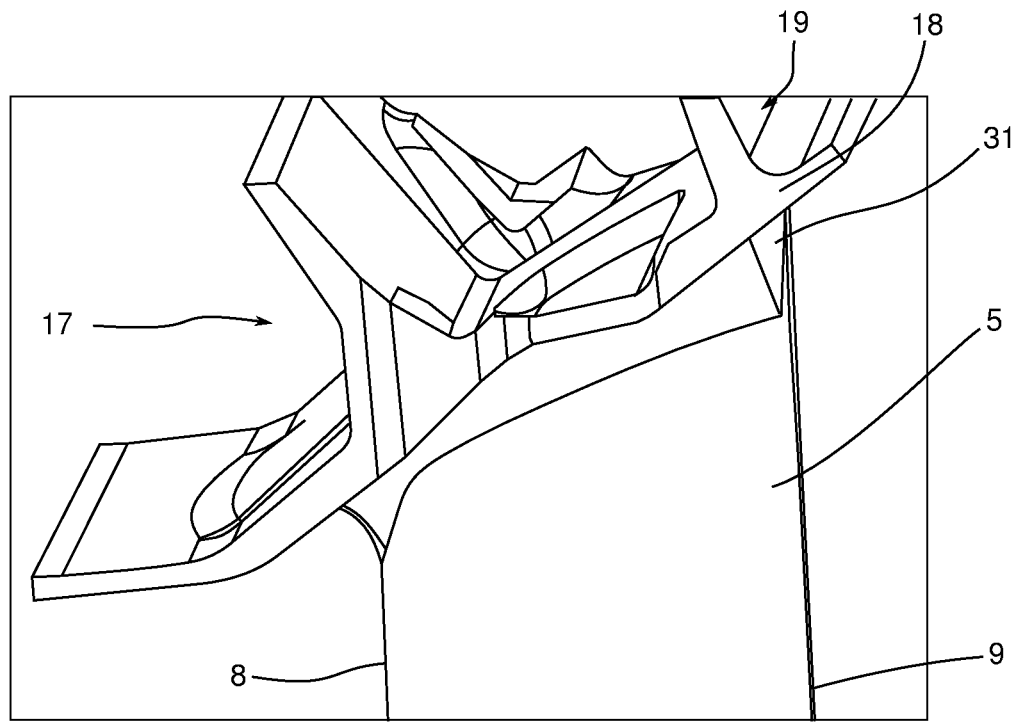
FIG. 8 is a perspective and detail view of a vane heel for a turbine engine with a thickening at the trailing edge according to the disclosure.

As can be seen in FIGS. 7 and 8, the trailing edge also has a second thickening 31 which is located on the trailing edge at the radially outer end, close to the platform of the heel. This thickening 31 has the same configurations as the first thickening, i.e., a height of between 10% and 30% from the radially outer end and a transverse extension on either side of the trailing edge.

The determination of the centre of gravity of the heel is obtained by means of a method for optimising the profile of a vane for a turbine engine of an aircraft. The various steps of the method are implemented using CADD and/or calculation software.

Firstly, the characteristics of the vane such as its mass, material, dimensions, etc. are referenced in the software.

In a first step, the blade 5 is divided into several (horizontal) transverse sections according to its radial height.

The blade transverse head section at the radially outer end (and located just before the radius of the heel, at 100% of the height of the blade) is selected.

The method then includes a step of calculating the centre of gravity G1 of the transverse head section ST. Prior to this calculation step, a mass is associated with the transverse head section ST. The centre of gravity G1 is defined as the geometric barycentre point of the transverse head section.

The coordinates of the centre of gravity G1 are defined, in the plane of the transverse head section, with respect to the reference frame of inertia comprising the first axis of inertia I1 and the second axis of inertia I2, the origin R1 of which is located on the centre of gravity G1 of the transverse head section.

The method further comprises a step of calculating the centre of gravity of the heel of the vane. Prior to this step, the mass of the heel of the vane is measured, which allows to determine its centre of gravity.

A comparison of the coordinates between the centre of gravity G1 of the transverse head section ST and the centre of gravity G2 of the heel 17 is carried out.

For this purpose, a measurement of the distance between the first and second centre of gravity G1, G2 is carried out. For this purpose, an orthogonal projection of the plane of the heel including its centre of gravity G2 is made in the plane of the transverse head section ST.

Finally, the method comprises a compensation step in which the second centre of gravity of the root is offset from the first centre of gravity of the head section in the predetermined zone. The compensation step comprises an at least transverse and axial offset of the centre of gravity G2 of the heel in the predetermined zone to reduce the aerodynamic stresses on the relatively thin trailing edge.

Typically once compared, if the centre of gravity G2 of the heel is not in the predetermined zone, at least partially V-shaped, a modification of the mass distribution of the heel is performed to move the centre of gravity G2 of the heel forward or backward. This operation is advantageously manual (in the design software) and of course depends on the manufacturing and integration criteria of the vane.

To compensate for the constraints at the relatively thin trailing edge of the blade, we can also manually adjust the distance of the leading edge and/or trailing edge from the first axis of inertia. To do this, we position the blade transverse sections relative to each other in the radial direction to limit the moment between them. By manually adjusting the values of $\delta^{Ax}$ and $\delta^{Tg}$ (from the formula below) with respect to the first axis of inertia, the offset is achieved and thus the moment is created. In the case of the thin trailing edge, we seek to modify the offset to decrease the stresses at the trailing edge.

The formula below characterises the stress σBF at the trailing edge along the first axis of inertia I1. This formula characterises the compensation at the leading and/or trailing edge as stated above.

$$\sigma_{BF} = \frac{F_z}{S} - \frac{V_{BF}}{I_1} \times \left[\cos(\theta) \times \left(M_{aero}^{Ax} + \delta^{Ax} \times F^c\right) - \sin(\theta) \times \left(M_{aero}^{Tg} + \delta^{Tg} \times F^c\right)\right]$$ [Math 2]

With:
Fz: Tractive force induced by the centrifugal force.
$F^c$: centrifugal force.
S: transverse head section.
$V_{BF}$: the distance of the point of the trailing edge from the first axis of inertia I1,
$M^{Ax}$ aero: M1 in the reference frame of inertia.
setting angle θ (theta): tilt angle of the platform between the reference frame of the turbine engine and the reference frame of inertia.
$M^{Tg}$ aero: M2 in the reference frame of inertia.
$\delta^{Ax}$: refers to the axial offset of the trailing edge.
$\delta^{Tg}$: refers to the tangential offset of the trailing edge.

When the distance VBA of the leading edge to the first axis of inertia I1 is smaller than the distance VBF of the trailing edge to the first axis of inertia I1, we apply, for example, an axial compensation (or displacement value in the axial direction ($\delta^{Ax}$)) of the leading edge upstream of about 1 mm and of the leading edge downstream of about 5 mm with respect to the axis of inertia I1. That is, we reduce or increase the distance of the trailing or leading edges from the first axis of inertia I1. In order to achieve a greater compensation of the axial moment, we can achieve an axial offset of the leading edge of about 2 mm upstream and an axial offset of the trailing edge downstream of about 6 mm.

When the distance VBA of the leading edge is greater than the distance VBF of the trailing edge, we apply a relatively large leading and trailing edge axial displacement value and/or a tangential displacement. In this case, it is possible to minimise the stress at the trailing edge.

The invention claimed is:

1. A vane for a turbine engine of an aircraft comprising a blade extending in a radial direction, the blade having a pressure side surface and a suction side surface which are connected upstream, in a direction of circulation of a gas in the turbine engine, by a leading edge and downstream by a trailing edge, the blade having, at a radially outer end, a heel and a transverse head section, said transverse head section being in a first plane perpendicular to the radial direction of the blade and being taken at the radially outer end, the heel extending outward from the transverse head section which has a first center of gravity, wherein the heel has a second center of gravity which is defined in a second plane parallel to the first plane of the transverse head section, the second center of gravity being offset at least transversely from the first center of gravity, the second center of gravity being defined, in the second plane, in a predetermined zone delimited at least in part by a first straight line and a second straight line forming a V which is open towards the pressure side surface, the predetermined zone in a V shaped comprises an apex whose orthogonal projection on the transverse head section is located on the first center of gravity.

2. The vane according to claim 1, wherein the first center of gravity is linked to a reference frame of inertia comprising a first axis of inertia and a second axis of inertia which are perpendicular and which pass through the first center of gravity, the first straight line being inclined at a first angle to the first axis of inertia and the second straight line being inclined at a second angle to the first axis of inertia.

3. The vane according to claim 2, wherein the first center of gravity is arranged at:
a first predetermined distance from a third straight line, defined in the first plane of the transverse head section, which is tangent with the leading edge at a point and parallel to the first axis of inertia, and
a second predetermined distance from a fourth straight line in the first plane of the transverse head section which is tangent to the trailing edge at a point and parallel to the first axis of inertia.

4. The vane according to claim 1, wherein the predetermined zone is delimited by a third straight line which is parallel to the first axis of inertia and offset towards the pressure side surface by a predetermined distance.

5. The vane according to claim 1, wherein the vane is movable and the blade is full.

6. The vane according to claim 1, wherein the vane comprises a root located at a radially inner end of the blade, opposite in the radial direction to the radially outer end, the trailing edge having a first thickening located radially between a first platform of the root and the blade, and extending transversely on either side of the trailing edge.

7. The vane according to claim 6, wherein the first thickening and a second thickening located between a second platform and the blade, each comprise an axial section of a triangular shape.

8. The vane according to claim 6, wherein the first thickening and a second thickening located between a second platform and the blade, each extend respectively from one of the radially inner and outer ends between 10 and 30% of a radial height of the blade.

9. The vane according to claim 1, wherein the heel comprises a second platform which is defined in a plane inclined radially outward and forming an angle of between 0° and 40° with the first plane of the transverse head section.

10. The vane according to the claim 9, wherein the trailing edge has a second thickening located between the second platform and the blade and extending at least partially transversely on either side of the trailing edge.

11. The vane according to claim 1, wherein the predetermined zone is delimited by a median line of the blade which is intersected by the first straight line and the second straight line.

12. The vane according to claim 1, wherein the predetermined zone is delimited by a curved line parallel to a median line of the blade, the curved line being located at a maximum distance corresponding to twice a transverse thickness of the blade from the suction side surface.

13. A movable wheel of a turbine engine comprising a disc centered on a longitudinal axis and a plurality of vanes, according to claim 1, each extending from a periphery of the disc and evenly distributed about the longitudinal axis.

14. A turbine engine comprising the wheel according to claim 13.

15. A turbine engine comprising the vane according to claim 1.

16. A method for optimizing a profile of the vane according to claim 1, the method comprising the following steps of:
calculating the first center of gravity,
calculating the second center of gravity;
comparing coordinates of the first center of gravity and the second center of gravity;
measuring a distance between the first and second centers of gravity according to an orthogonal projection of the second plane; and offsetting at least transversely the second center of gravity from the first center of gravity in the predetermined zone.

* * * * *